United States Patent [19]

Webb, Jr.

[11] Patent Number: 4,640,658
[45] Date of Patent: Feb. 3, 1987

[54] DEMOUNTABLE CARRIER FOR MOUNTING ON VEHICLES

[76] Inventor: Grandville S. Webb, Jr., Rte. 1, Box 75, Harriman, Tenn. 37748

[21] Appl. No.: 779,665

[22] Filed: Sep. 24, 1985

[51] Int. Cl.$^4$ ............................................. B60R 9/06
[52] U.S. Cl. ............................. 414/462; 224/42.03 R; 224/42.08; 280/415 A
[58] Field of Search ................. 414/462; 224/42.03 R, 224/42.03 A, 42.03 B, 42.07, 42.08, 42.44; 280/402, 415 R, 415 A, 490 R, 491 R, 491 B, 491 E

[56] References Cited

U.S. PATENT DOCUMENTS

| | | | |
|---|---|---|---|
| 3,796,333 | 3/1974 | Goldstein | 414/462 |
| 3,805,984 | 4/1974 | Schwarz et al. | 414/462 |
| 4,280,713 | 7/1981 | Bruhn | 280/415 A |
| 4,411,580 | 10/1983 | Kelly | 414/462 |
| 4,413,761 | 11/1983 | Angel | 224/42.03 R X |

*Primary Examiner*—Leslie J. Paperner
*Attorney, Agent, or Firm*—Pitts and Brittian

[57] ABSTRACT

A demountable carrier for attachment to the tongue of a vehicle trailer hitch. The carrier includes a hollow socket member for attachment to the tongue, with the axis of the bore of the socket member generally parallel to the ground and perpendicular to the long axis of the tongue of the hitch. An L-shaped plug member has one leg thereof dimensioned to be closely received in the bore of the socket member, and aligned apertures in both the socket member and the plug member are receptive of a releasable pin to retain the leg of the plug member in the bore. The second leg is provided with a support at its free end to attach a carrier unit. The cross-sections of the plug member and the bore of the socket member are selected whereby the plug member can be moved from a deployed position to extend behind the vehicle, or a stored position above the trailer hitch. The plug member also permits transfer to another vehicle having a complimentary socket member. The invention is described, in one embodiment relative to a wheel chair carrier.

11 Claims, 6 Drawing Figures

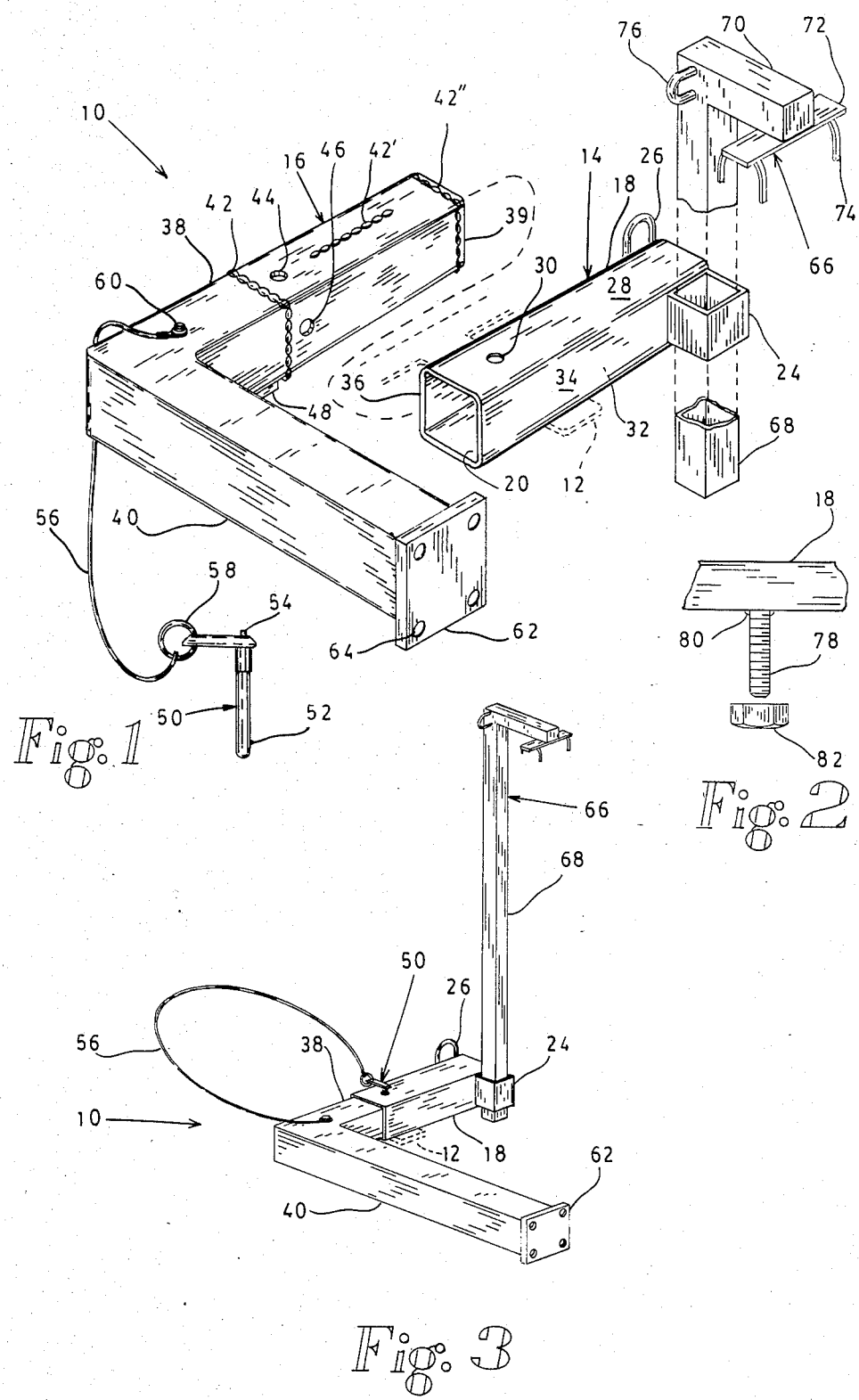

DEMOUNTABLE CARRIER FOR MOUNTING ON VEHICLES

TECHNICAL FIELD

This invention relates generally to devices for mounting on trailer hitches for carrying objects, and more particularly to a carrier for bolting to the tongue of such hitches and which permits the major portion of the carrier to be easily removed for transfer to another vehicle or for storage. Alternatively, the major portion of the carrier can be easily moved from a "deployed" position to a "stored" position. The carrier is intended for any desired use, such as the transport of sporting goods, bicycles, wheel chairs and the like.

BACKGROUND OF THE INVENTION

A variety of devices have been employed for attachment to the rear bumper of vehicles or to a conventional trailer hitch attached to such vehicles. A relatively large number of these devices are specifically for the transport of wheel chairs for use by handicapped persons when they reach their destination by travel in the vehicle. Three such wheel chair carriers are shown and described in U.S. Pat. No. 4,400,129, issued Aug. 23, 1983 to J. Eisenberg; U.S. Pat. No. 4,297,069, issued to B. C. Worthington on Oct. 27, 1981; and U.S. Pat. No. 4,213,729, issued on July 22, 1980 to C. W. Cowles, et al. The devices described in the first and third of these patents are designed to be attached to a conventional tongue of a vehicle trailer hitch. When it is desired, or is necessary, to remove the device from the vehicle, a threaded bolt that is passed through an aperture of the device and the aperture of the hitch must be removed. This requires the use of tools and for this reason, the carrier is seldom, if ever, removed. The device can then be placed in the vehicle trunk or another storage space. If it is to be used on another vehicle having an appropriate hitch unit, the bolt (again requiring tools) is then used for the fastening to that hitch. The device in the second of the references utilizes special fastening units to attach the device to the vehicle.

Each of these units has a provision for moving the carrying portion to either a "deployed" position where the wheel chair can be placed thereon and fastened, or to a "stored" position which is generally vertically oriented to minimize space. Various types of pivots, springs and locking pins are utilized to enable the movement between these two positions. Because of these pivot mechanisms, the devices extend several inches behind the vehicle trailer hitch even when the carrier is upright in the stored position. This projection produces a vunerable item when in contact with another vehicle, and the unit frequently drags the pavement when the vehicle is moving over a dip such as between a street and a driveway. A further problem occurs when a family with a handicapped person has more than one vehicle: either the person must be transported only in the vehicle having the wheel chair carrier, or all vehicles must be equipped with a carrier—an expensive solution.

Other known patents related to this general field are U.S. Pat. Nos. 3,800,967; 4,411,580; 4,301,953; 4,413,761; and 4,437,599. Of these, only the '580 and '953 patents involve a device for attaching to the tongue of a conventional trailer hitch.

Accordingly, it is a principle object of the present invention to provide a carrier for the releasable attachment to a vehicle which eliminates the need for multiple carriers when an owner wishes to utilize the carrier on more than one vehicle.

It is another object to provide a demountable carrier for a vehicle, with the major portion of the carrier removable without use of tools.

A further object of the present invention is to provide a carrier for vehicles which can be moved from a deployed position to a stored position, and which does not add any substantial length to the trailer hitch and therefore minimizes dragging during movement of the vehicle over uneven terrain.

It is also an object to provide a demountable carrier for trailer hitches which eliminates complex apparatus and thereby reduces the cost of fabrication of a carrier.

These and other objects of the present invention will become more apparent upon a consideration of the drawings and their description given herein.

SUMMARY OF THE INVENTION

According to the present invention, there is provided a socket member that is mounted transversely to the hitch tongue using a bolt member attached thereto which passes through the conventional aperture in the tongue. A plug member, being L-shaped, has one leg for insertion into the socket member and a second leg projecting at substantially right angles to the first. The extreme end of this second leg supports any type of carrier unit: a basket for bulky articles, a flat platform, a wheel chair support, etc. The matching cross-sections of the bore of the socket and the plug are chosen to prevent relative rotation. Furthermore, these cross-sections are chosen such that the first leg of the plug member can be inserted into the socket member in either of two positions: with the second leg projecting horizontally from the rear of the vehicle (the deployed position), or vertically (the stored position). Each of the socket member and the first leg of the plug member are provided with aligned apertures to releasably accept a pin in either of these positions. Thus, the plug member and any type of carrier unit attached thereto can be either rotated between the two positions, or can be completely removed from the vehicle leaving the socket member attached to the trailer hitch tongue so that the main carrier unit can be switched between vehicles without the use of tools.

BRIEF DESCRIPTION OF THE DRAWINGS

FIG. 1 is an isometric drawing showing the essential components of the present invention.

FIG. 2 is a drawing, partially cut away, showing the bolt for securing the socket member of the present invention to a trailer hitch tongue or like member of a vehicle.

FIG. 3 is an isometric drawing illustrating the present invention in a deployed position.

DETAILED DESCRIPTION OF THE INVENTION

Figure 4:
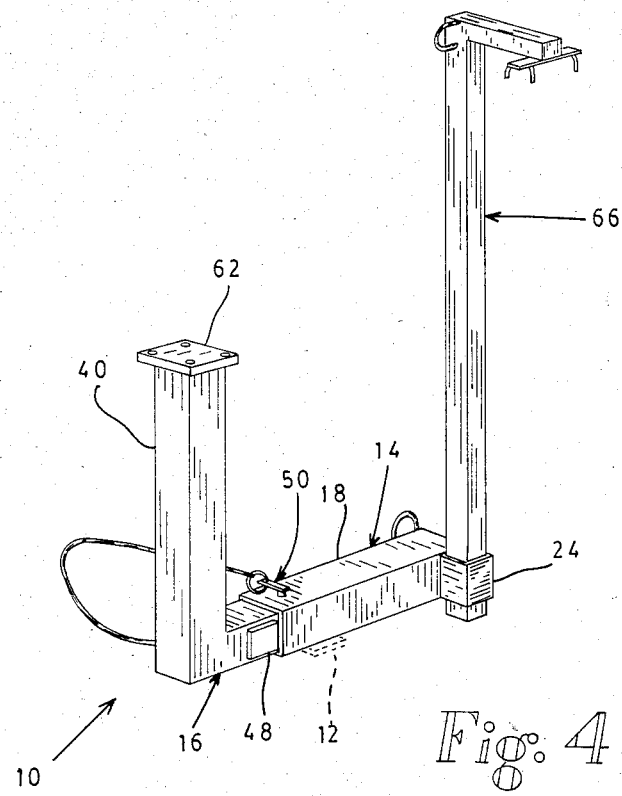
FIG. 4 is an isometric drawing illustrating the present invention in a stored position.

Referring now to FIG. 1, shown therein at 10 is one embodiment of the present invention. It is shown as attached to a tongue 12 of a conventional trailer hitch. The invention has two basic components: a socket member or receptor 14 and a plug member 16. The socket member 14 is principally a hollow body 18 having, in this embodiment, a bore 20 of substantially square cross section. When in use, the axis of this bore 20 is aligned perpendicularly to the long axis of the tongue 12 and parallel to the ground. One end (first end) of the bore 20 is open, as shown, and the other (second) end can be either open or closed. Proximate the second end, the body can be optionally provided with an open channel 24 with a bore axis perpendicular to that of the body 18, the purpose of this channel 24 is described hereinafter. Although the bore of channel 24 is shown as being substantially square in cross-section, it can have other cross-section configurations. This channel 24 can be attached to the body 18 as by welding. Also proximate this second end, an eye 26 can be provided. This eye 26 can be welded or otherwise fastened to the body 18. Near, but spaced from the first end of the body 18, the top wall 28 of the body 18 is provided with an aperture 30. A second aperture (not shown) is provided in the bottom wall 32 vertically aligned with the aperture 30. These apertures are equally spaced from the front and rear walls 34, 36, respectively.

The second principal portion of the invention, namely the plug member 16, is formed from two legs 38, 40 that are substantially perpendicularly joined. At least leg 38 has a cross-section to match and to be received in the bore 20 of the socket member 14. When the exterior dimensions of the leg 38 are less than those of the bore 20, raised portions 42, 42' and 42" can be formed on the exterior of the leg 38 as with weld beads. This prevents rattling of the components 14, 16. The leg 38 is provided with two pairs of apertures 44, 46 that can be caused to be aligned with the apertures 30 in the socket 14 depending upon the orientation of leg 40 as the leg 38 is inserted in the bore 20. A stop plate 48 or the equivalent is attached to leg 38 to govern the distance of insertion of leg 38 into the bore 20 in order to provide proper alignment of the apertures. Alternatively, the second end of the socket member can be at least partially closed, with the leg 38 of the plug member being of sufficient length whereby the extreme end 39 contacts this closure to effect the alignment of the holes.

A quick release pin 50 is provided to pass through either of appropriate of the apertures 44, 46 and 30 to releasably fasten the plug member 16 in the socket member 14. This pin has a detent 52 and a push-pin 54 to release the detent, and it is fastened to a lanyard 56 as with a ring 58. The opposite end of the lanyard is attached to the plug member 16 as with a screw 60. It will be recognized that the lanyard is not essential to the present invention, and that any type of pin can be used to pass through the apertures.

The leg 40 is shown to have the same cross-section as the leg 38 in the embodiment. However, it can have any suitable cross-section that provides sufficient strength to support a carrier unit (and load) attached to plate 62 at the outer end thereof. This plate is provided with a plurality of apertures as at 64 for the attachment of any particular carrier unit for a load. This carrier unit can be, for example, a basket, a platform, a carrier for a wheel chair or the like.

Also shown in FIG. 1 is a "hold-down" arm or clamp 66. This clamp has a shaft 68 of a cross-section to be received in the channel 24, and a head 70. This head 70 carries, for example, a cross piece 72 having a plurality of fingers 74. It also carries a second eye 76 such that a strap or other biasing means (not shown) can be engaged with the eyes 26 and 76 to firmly hold the fingers 74 engaged with a load carried on a carrier unit attached to the plate 62 on leg 40. It will be recognized that for some loads the clamp is not required.

Shown in FIG. 2 is the manner for holding the socket member 14 to a trailer hitch tongue. A bolt 78 is affixed to the exterior of the body 18, as with a weld 80, with this bolt of sufficient length to pass through a hole in the tongue and accept a nut 82. If desired, a washer and/or lock washer (not shown) can be used between the nut 82 and the underside of the trailer hitch tongue to ensure a firm connection between the socket member and the tongue. Further safety can be achieved by using a crown nut with a pin passing through the bolt. Other forms of fastener members are considered to be within the scope of the present invention.

As set forth above, the present invention provides for two positional orientations: a deployed position and a stored position. The deployed position is illustrated in FIG. 3. It can be seen that the leg 40 projects from a vehicle in a direction parallel to the long axis of the trailer hitch tongue 12. In this position, the pin 50 passes through apertures 30 in the body 18 and apertures 44 in the plug arm 38. Thus, any carrier unit attached to the plate 62 would be placed behind the vehicle in a position for carrying a load.

The stored position is illustrated in FIG. 4. This position is achieved from the position shown in FIG. 3 by removing the pin 50, withdrawing the plug member 16 from the socket member 14, rotating the plug member ninety degrees and reinserting it in the socket. The pin 50 can then be inserted through aperatures 30 in the socket member 14 and apertures 46 in the plug 16. In this position, any carrier unit attached to the plate 62 is stored behind the vehicle in a generally vertical orientation. In this stored position, no portion of the present invention projects substantially farther than the end of the tongue at the hitch level so as to prevent dragging of any component when the vehicle traverses a dip, etc. When no load is being carried, the clamp 66 would be removed.

The drawings depict the plug member being inserted in an end of the socket member directed away from the curb side of a vehicle. There may be applications, however, where insertion in the opposite end of the socket may be desirable as, for example, to improve balance of a load on a carrier. With a proper orientation in the apertures, this embodiment is within the scope of the invention. Also, the socket member can be provided with two pairs of apertures, and the plug with one pair (or both with two pair), with such modification being within the scope of the invention.

Figure 5:
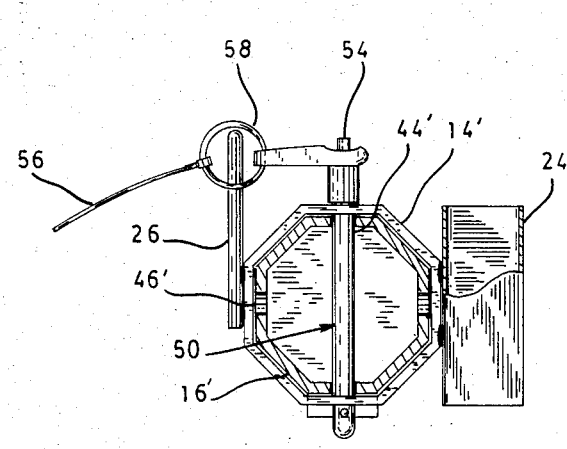
FIG. 5 is a cross-sectional drawing illustrating a different cross-sectional configuration that provides the non-rotation required of the socket member and the plug member of the present invention.

Although a square cross-section for the socket and plug members is preferred, any particular cross-section that permits interlocking of the parts without allowing rotation thereof is within the scope of this invention. For example, in FIG. 5 is shown an embodiment wherein each of the socket member 14' and plug member 16' are octagonal. The other components are the same as shown in the prior figures. This configuration permits one orientation of ninety (90) degrees from a second orientation.

Figure 6:
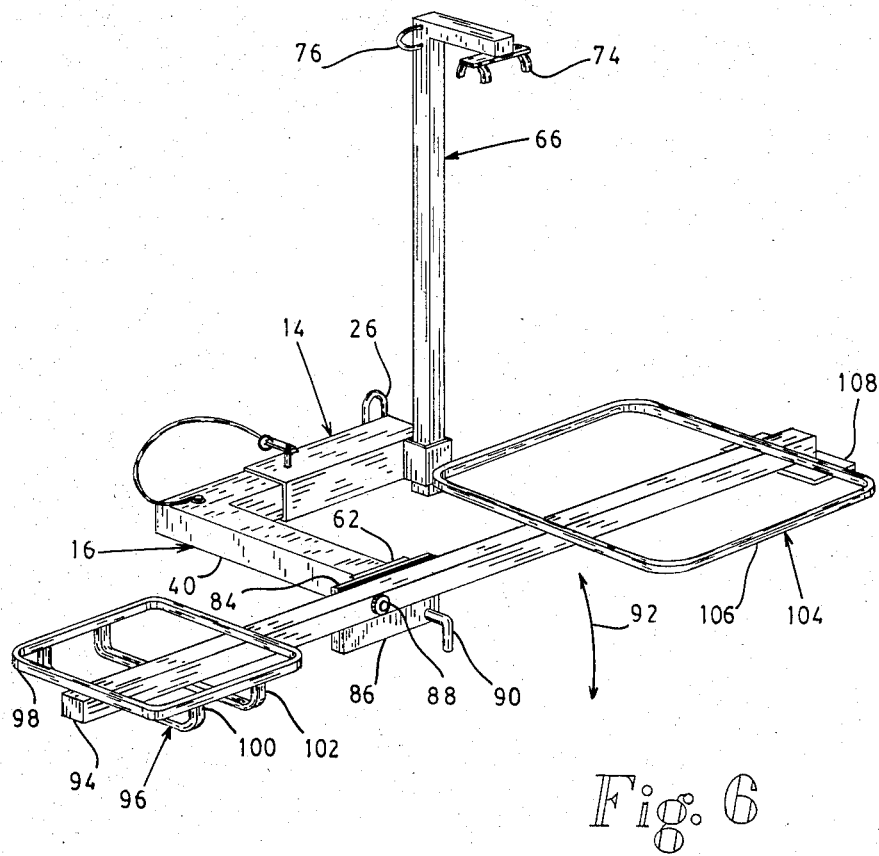
FIG. 6 is an isometric drawing illustrating use of the present invention as applied on a wheel chair carrier.

As stated above, the structure illustrated in FIG. 1 can be used with various types of carrier units where it is desired to carry a load at the rear of a vehicle. One such usage is illustrated in FIG. 6 in the form of a wheel chair carrier. This is similar to the carrier unit portion of the device illustrated in the '729 reference. For this application, the carrier unit is attached to the aforementioned plate 62 at the end of leg 40. In this embodiment, the wheel chair carrier unit is depicted as having an attachment plate 84 (which can be the plate 62). A second plate 86 is pivotally mounted from plate 84 as with a pivot member 88 which can be a threaded bolt and nut. A retractable locking pin 90 normally maintains plate 86 non-rotatable with respect to plate 84. However, when the pin 90 is disengaged from plate 84, the carrier unit can be tipped downward toward the curb side in the direction indicated by the arrow 92.

Affixed to plate 86 is an elongated bar 94 which substantially defines an axis of symmetry for the carrier unit. Preferably this bar is provided with means (not shown) for adjusting the effective length thereof. Supported by, and attached at a first end of the bar 84, is a carrier 96 for the front (small) wheels of a collapsed wheel chair. This carrier 96 has a perimeter frame 98 and one or more cross pieces 100, 102 whereby different sized wheels can be accommodated.

Supported on, and attached to, the second end of the bar 94 is a carrier 104 for the rear (large) wheels of the wheel chair. This carrier has a perimeter frame 106. Generally the large wheels, although they may differ between wheel chairs, do not necessitate cross pieces on the carrier 104 although such could be provided. Since it is this second end of the bar 94 that tips downward to facilitate loading or unloading of a wheel chair, a stop plate 108 can be provided to contact the ground while the carrier is in the downward position. When in the downward position, a wheel chair can be loaded or unloaded from the curb side with essentially no lifting. In addition, little exertion is needed to pivot the carrier unit to a travel position. It can be seen that when the rear wheel carrier is in the "up" position as illustrated, the fingers 74 of the clamp 66 can be made to engage the top of at least one of the wheel chair wheels and thus lock the wheel chair on the carrier unit. A strap or other releasable connector (not shown) between the eyes 26 and 76 would maintain contact between the fingers 74 and the rear wheel.

Although the present invention has been described with respect to specific embodiments, it will be understood that various changes and modifications will be suggested to one skilled in the art. The materials of construction can be selected from any that provide sufficient strength. This can include steel, aluminium alloys, etc. Also, while intended primarily for use at the rear of a vehicle, the present invention can be used on the front of a vehicle if properly equipped with a hitch. Accordingly, the scope of the invention is not to be limited by the specific descriptions but by the appended claims and their equivalents.

I claim:

1. A demountable carrier for attachment to a trailer hitch mounted upon a vehicle and having a flat tongue extending from such vehicle substantially parallel to ground, such tongue provided with an aperture, which comprises:

a hollow elongated socket member having a bore of a selected cross-section and being provided with at least one pair of aligned apertures in opposite surfaces oriented perpendicular to said bore, said socket member being provided with fastening means for passing through such aperture in such tongue to secure said socket member to such tongue in an orientation substantially perpendicular to a long axis of such tongue and parallel to such ground;

an L-shaped plug member having first and second legs substantially at right angles to each other, said first leg having a selected cross section and length to be closely received in said socket member, said second leg having a free end to support a carrier unit, said first leg provided with at least one aperture therethrough oriented perpendicularly to said first leg whereby said aperture in said first leg is aligned with said apertures in said socket member when said first leg is inserted in said socket member;

a removable pin for passing through selected aligned apertures in said first leg and said socket member;

wherein the number of apertures in said socket member and said first leg of said plug member is selected whereby said pin is receivable in aligned apertures when said second leg is either substantially vertically oriented or substantially horizontally oriented with respect to said ground; and wherein said selected cross sections of said first leg of said plug and said bore of said socket member prevent rotation between said plug member and said socket member and permit said first leg to be inserted into said bore in said two orientations of said second leg substantially perpendicular to each other.

2. The carrier of claim 1 wherein said selected cross sections of said socket member and said first leg of said plug member are complimentary square cross sections.

3. The carrier of claim 1 wherein said socket member is provided with one pair of aligned apertures, one in a top wall of said bore and one in a bottom wall of said bore, and said first leg of said plug member is provided with a pair of apertures therethrough to achieve said two orientations of said second leg of said plug member.

4. The carrier of claim 1 wherein a stop plate is attached to said first leg of said plug member whereby said aperture of said first leg and said apertures in said socket member are automatically aligned when said first leg is fully inserted into said bore of said socket member and said stop plate is against said socket member.

5. The carrier of claim 1 further comprising a channel member attached to an external surface of said socket member, said channel member having a bore substantially perpendicular to said bore of said socket member and substantially vertically oriented, and a clamp member releasably carried by said channel member, said clamp member comprising a shaft to be received in said bore of said channel member and a head member attached at one end of said shaft, said head member provided with fingers.

6. The carrier of claim 1 wherein said free end of said second leg of said plug member is provided with a mounting plate to accept said carrier unit.

7. The carrier of claim 5 further comprising an eye-type fastener attached to said socket member proximate said channel member, and an eye-type fastener attached to said clamp member proximate said head member, said eye-type fasteners adapted to accept a tie-down element for attachment between said eye-type fasteners.

8. The carrier of claim 6 further comprising a carrier unit attached to said mounting plate, said carrier unit adapted to support a load thereon when said second leg of said plug member is horizontally oriented, and to be carried in a stored position when said second leg is vertically oriented.

9. A demountable carrier for attachment to a flat tongue of a trailer hitch mounted upon a vehicle, such tongue provided with an aperture and extending from such vehicle substantially parallel to ground, such carrier comprising:

an elongated socket member having a first end and a second end, said socket member being provided with a threaded bolt member attached thereto for passing through such aperture of such tongue to receive a nut to secure said socket member to such tongue in an orientation substantially perpendicular to a long axis of such tongue and parallel to such ground, said socket member having a bore of substantially square cross section extending from said first end to substantially said second end, said socket member defining a top wall, a bottom wall and front and rear walls, said socket member being provided with a first aperture in said top wall proximate said first end and a second aperture in said bottom wall vertically aligned with said first aperture, said first and second apertures equally spaced between said front and rear walls;

an L-shaped plug member having first and second legs substantially at right angles to each other, said first leg having a substantially square cross section of a dimension to be closely received in said bore of said socket member, said second leg having a free end to support a carrier unit, said first leg being provided with a pair of apertures oriented at right angles to each other and at a position whereby one of said apertures in said first leg is aligned with said apertures in said socket member when said first leg is inserted in said socket member a selected distance and said second leg is substantially horizontally oriented, and said second of said pair of apertures is aligned with said apertures in said socket member when said second leg is inserted in said socket member said selected distance and said second leg is substantially vertically oriented;

a removable pin for passing through selected of said apertures in said first leg and said socket member to achieve said vertical and horizontal orientation of said second leg, said pin having a releasable detent to prevent unintentional removal from said apertures, said pin attached with a flexible lanyard to said plug member.

10. The carrier of claim 9 further comprising:

a stop plate attached to a surface of said first leg of said plug member to bear against said first end of said socket member when said first leg is inserted in said bore to provide alignment of apertures in said first leg and in said socket member;

a channel member attached to an external surface of said socket member proximate said second end, said channel member having a bore substantially perpendicular to said bore of said socket member and substantially vertically oriented;

a clamp member releasably carried by said channel member, said clamp member comprising a shaft to be received in said bore of said channel member, and a head member attached at one end of said shaft, said head member provided with fingers;

a first fastener attached to said socket member proximate said channel member; and a second fastener attached to said clamp member proximate said head member, said first and second fasteners adapted to accept an adjustable tie-down element between said fasteners.

11. A demountable carrier for wheelled objects having at least one wheel and at least one rear wheel, such carrier for attachment to a flat tongue of a trailer hitch mounted upon a vehicle, such tongue provided with an aperture and extending from such vehicle substantially parallel to ground, such carrier comprising:

an elongated socket member having a first end and a second end, said socket member being provided with a threaded bolt member attached thereto between said first and second ends for passing through such aperture in such tongue to receive a threaded nut to secure said socket member to such tongue in an orientation substantially perpendicular to a long axis of such tongue and parallel to such ground, said socket member having a bore of substantially square cross section extending from said first end to substantially said second end, said socket member defining a top wall, a bottom wall and front and rear walls, said socket member being provided with a first aperture in said top wall proximate said first end and a second aperture in said bottom wall vertically aligned with said first aperture, said first and second apertures being equally spaced between said front and rear walls;

an L-shaped plug member having first and second legs substantially at right angles to each other, said first leg having a substantially square cross section of a dimension to be closely received in said bore of said socket member, said second leg having a free end, said first leg being provided with a pair of apertures oriented at right angles to each other and at a position whereby one of said apertures in said first leg is aligned with said apertures in said socket member when said first leg is inserted in said socket member a selected distance and said second leg is substantially horizontally oriented, and said second of said pair of apertures in said first leg is aligned with said apertures in said socket member when said first leg is inserted in said socket member said selected distance, and said second leg is substantially vertically oriented;

a removable pin for passing through selected of said apertures in said first leg and said socket member to achieve said vertical and horizontal orientation of said second leg, said pin having a releasable detent to prevent unintentional removal from said apertures, said pin being attached to said plug member with a flexible lanyard;

a stop plate attached to a surface of said first leg of said plug member to bear against said first end of said socket member when said first leg is inserted into said bore of said socket member said selected distance to provide alignment of apertures in said first leg and in said socket member;

a channel member fixedly attached to an external surface of said socket member proximate said second end, said channel member having a bore of substantially square cross section that is substantially perpendicular to said bore of said socket member and substantially vertically oriented;

a clamp member releasably carried by said channel member, said clamp member comprising a shaft to be closely received in said bore of said channel member, and a head member attached at one end of said shaft, said head member being provided with fingers to frictionally contact at least one of such rear wheels of such wheel chair;

a first fastener attached to said socket member proximate said second end, and a second fastener attached to said clamp member proximate said head member, said first and second fasteners adapted to accept an adjustable tie-down element between said fasteners to achieve said frictional contact of said fingers with such rear wheel;

an elongated bar pivotally attached to said free end of said second leg of said plug member, said bar being substantially perpendicular to said second leg and having a first end and a second end;

releasable locking means cooperating between said bar and said free end of said second leg whereby said first end of said bar can be pivoted downward toward such ground or said bar can be locked substantially parallel to such ground;

a frame carried by said first end of said bar to support such rear wheel of such wheelled object; and a frame carried by said second end of said bar to support such front wheel of such wheelled object.

* * * * *